United States Patent [19]

Levine et al.

[11] Patent Number: 5,121,414

[45] Date of Patent: Jun. 9, 1992

[54] CARRIER FREQUENCY OFFSET EQUALIZATION

[75] Inventors: Stephen N. Levine, Itasca; Robert J. Irvine, Schaumburg, both of Ill.

[73] Assignee: Motorola, Inc., Schaumburg, Ill.

[21] Appl. No.: 564,931

[22] Filed: Aug. 9, 1990

[51] Int. Cl.$^5$ .............................................. H04B 1/26
[52] U.S. Cl. ........................................ 375/96; 375/97; 375/114; 455/258
[58] Field of Search ................... 364/565, 728.03, 819; 375/1, 96, 97, 114, 116, 119; 455/257, 258, 259, 260

[56] References Cited

U.S. PATENT DOCUMENTS

| | | | |
|---|---|---|---|
| 4,354,277 | 10/1982 | Crackel et al. | 455/259 |
| 4,621,365 | 11/1986 | Chiu | 364/728.03 |
| 4,769,816 | 9/1988 | Hochstadt et al. | 375/96 |
| 4,829,543 | 5/1989 | Borth et al. | 375/83 |
| 4,885,757 | 12/1989 | Provence | 375/96 |

*Primary Examiner*—Benedict V. Safourek
*Attorney, Agent, or Firm*—F. John Motsinger

[57] ABSTRACT

In a receiver employing complex correlation, there is provided a mechanism for carrier frequency offset equalization. There exists a linear phase progression in the correlation process that is indicative of frequency offset. One method involves curve fitting the phase progression in order to warp the sync word against which subsequent correlation is performed rather than controlling the reference frequency of the receiver. The other successively approximates the phase progression by pre- and re-warping the synchronization reference word within the correlation process itself rather than controlling the reference frequency of the receiver.

8 Claims, 4 Drawing Sheets

CARRIER FREQUENCY OFFSET EQUALIZATION

THE FIELD OF INVENTION

This invention is concerned with channel equalization.

More particularly, in a receiver employing complex correlation, this invention is concerned with carrier frequency offset equalization.

BACKGROUND OF THE INVENTION

Equalization is the process of removing (transmitter and) channel-induced distortion from a received signal.

In cellular radiotelephone systems, ambulatory (mobile) radiotelephones are Automatically Frequency Controlled (AFC) to the carrier frequency of the fixed transmitter with which it is communicating (or monitoring). (Fixed) scan receivers are employed in adjacent cells to intermittently and rapidly acquire and monitor those mobile transmissions to determine which fixed transmitter would best serve that mobile (e.g., handoff). Since scan receives are simple monitoring apparatus (and do not actively carry on voice communications), they are less complex and may not have AFC. The problem then for scan receivers is that the cumulative effects of frequency stability and tolerance of crystal oscillators in the fixed transmitters, the mobile's AFC resolution ($\pm 200$ Hz), and the Doppler effect of ambulatory radiotelephones total in excess of 780 Hz of frequency offset error (distortion) on a 900 MHz carrier.

Typically, the monitored signal is acquired by looking for correlation against a known transmitted synchronization pattern, but this frequency distortion lessens the chances of detection of the sync word by complex correlation. Where the theoretical normalized vector sum of a quadrature modulated (pi/4 QPSK) signal in the absence of frequency offset error would have a perfect, 100% complex correlation (magnitude one, phase zero—$1 \angle 0$), a 780 Hz frequency offset results in the summation of a curved vector path and a normalized correlation of only 66% (i.e., $0.66 \angle 81$). Clearly, some form of equalization is required to avoid a missed detection due to frequency-offset-induced low correlation.

This invention takes as its object to overcome these shortcomings and to realize certain advantages presented below.

SUMMARY OF THE INVENTION

In a receiver employing complex correlation, there is provided a mechanism for carrier frequency offset equalization. There exists a linear phase progression in the correlation process that is indicative of frequency offset. One method involves curve fitting the phase progression in order to warp the sync word against which subsequent correlation is performed rather than controlling the reference frequency of the receiver. The other successively approximates the phase progression by pre- and re-warping the synchronization reference word within the correlation process itself rather than controlling the reference frequency of the receiver.

DESCRIPTION OF THE DRAWINGS

Additional objects, features and advantages of the invention will be more clearly understood and the best mode contemplated for practicing it in its preferred embodiment will be appreciated (by way of unrestricted example) from the following detailed description, taken together with the accompanying drawings in which.

DETAILED DESCRIPTION

Figure 1:
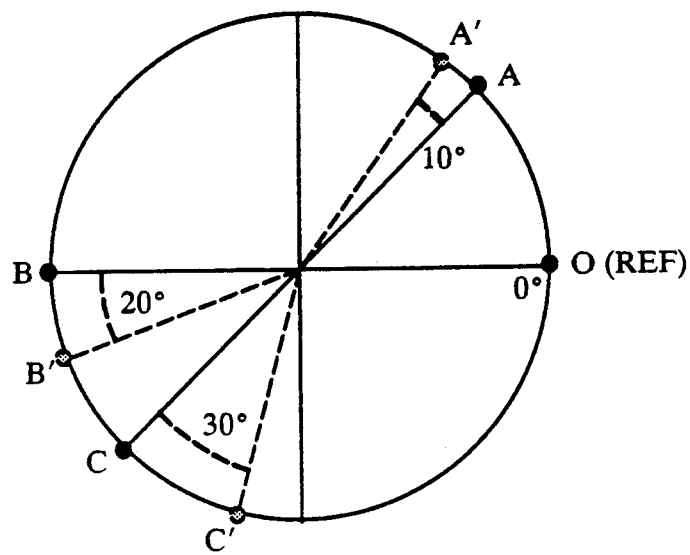
FIG. 1 is a phase diagram of transmitted and received symbols.
Figure 2:
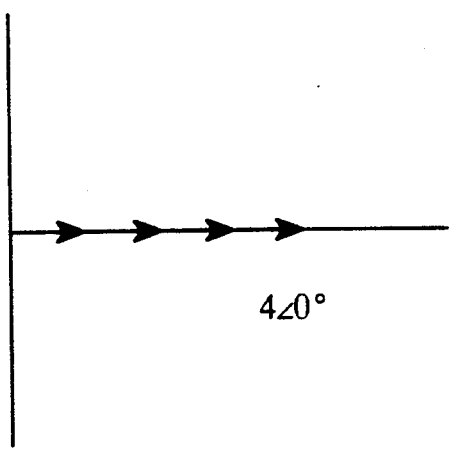
FIG. 2 illustrates a correlation vector sum without carrier frequency offset.
Figure 3:
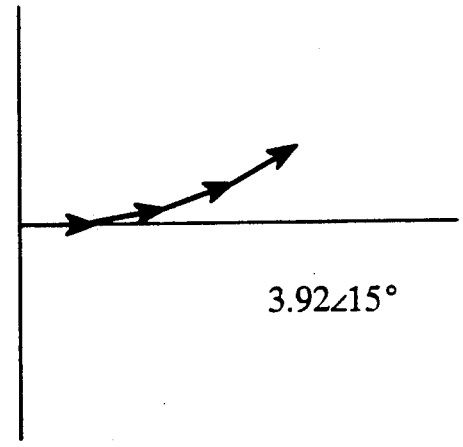
FIG. 3 illustrates a correlation vector sum with carrier frequency offset.
Figure 4:
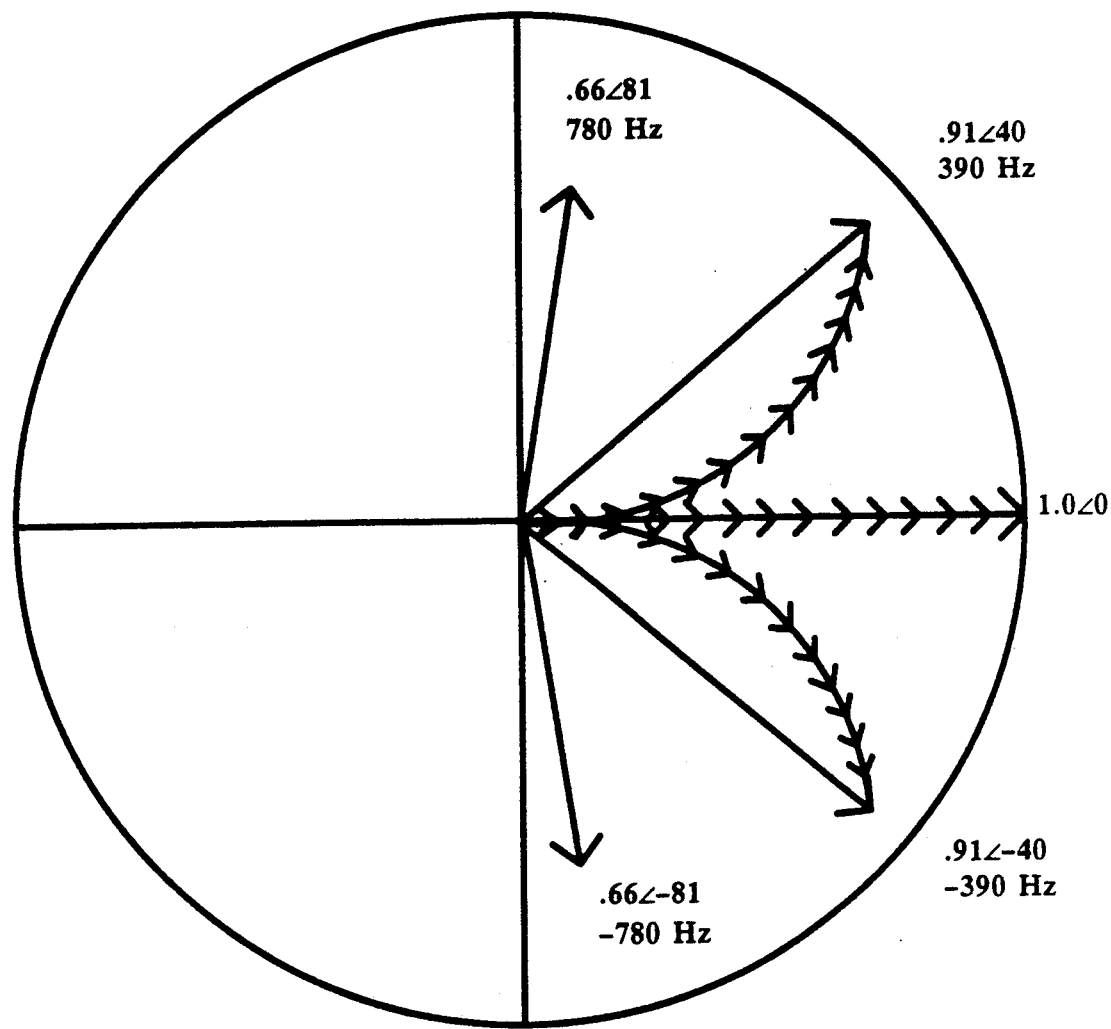
FIG. 4 illustrates a correlation vector sum with a worst-case carrier frequency offset.

FIG. 1 is a phase diagram of transmitted and received symbols. It illustrates three symbols (A, B & C) transmitted at phase changes of $\Delta 45°$, $\Delta 135°$ and $\Delta 45°$, respectively. Thus, beginning at a reference (O) of $1 \angle 0$:

$$1 \angle 0 + \Delta 45° = 1 \angle 45; + \Delta 135° = 1 \angle 180;$$
$$+ \Delta 45° = 1 \angle -135$$

which, when vectorially summed with the complex conjugate of the correlation sync word:

$$1 \angle 0 \quad 1 \angle -45 \quad 1 \angle -180 \quad 1 \angle 135$$

yields the following summed correlation vector terms (with magnitude $\angle$ phase $\phi(i)$):

$$1 \angle 0 + 1 \angle 0 + 1 \angle 0 + 1 \angle 0 = 4.0 \angle 0$$

as illustrated in FIG. 2. FIG. 1 further illustrates those three transmitted symbols (A, B & C) as received (A', B' & C') at a receiver experiencing a 675 Hz frequency offset (10° per symbol @ 24.3K symbols/sec). Note that the phase error (10°) is cumulative and monotonically increasing. Thus, beginning at a receiver reference of $1 \angle 0$ (assuming no initial phase difference between transmitter and receiver):

$$1 \angle 0 + \Delta 45° + \Delta 10° = 1 \angle 55; + \Delta 135° + \Delta 10° -$$
$$= 1 \angle -160; + \Delta 45° + \Delta 10° = 1 \angle -105$$

which, when vectorially summed with the complex conjugate of the correlation sync word:

$$1 \angle 0 \quad\quad 1 \angle -45 \quad\quad 1 \angle -180 \quad\quad 1 \angle 135$$

yields:

$$1 \angle 0 \quad + \quad 1 \angle 10 \quad + \quad 1 \angle 20 \quad + \quad 1 \angle 30 \; = \; 3.92 \angle 15$$

as illustrated in FIG. 3. This represents, after three transmitted symbols at 675 Hz offset, some 3.92/4.00 or 98% correlation, but after some fourteen symbols (as in the presently-proposed US Digital Cellular standard) at an offset error of 780 Hz, falls to a mere 66% correlation (as illustrated in FIG. 4)—too low to be detected without falsing, particularly in the presence of noise.

In accordance with the present invention, the monotonically increasing correlation error is determined and the reference sync word against which correlation is performed is adjusted in the correlation process to compensate for the error.

Figure 5:
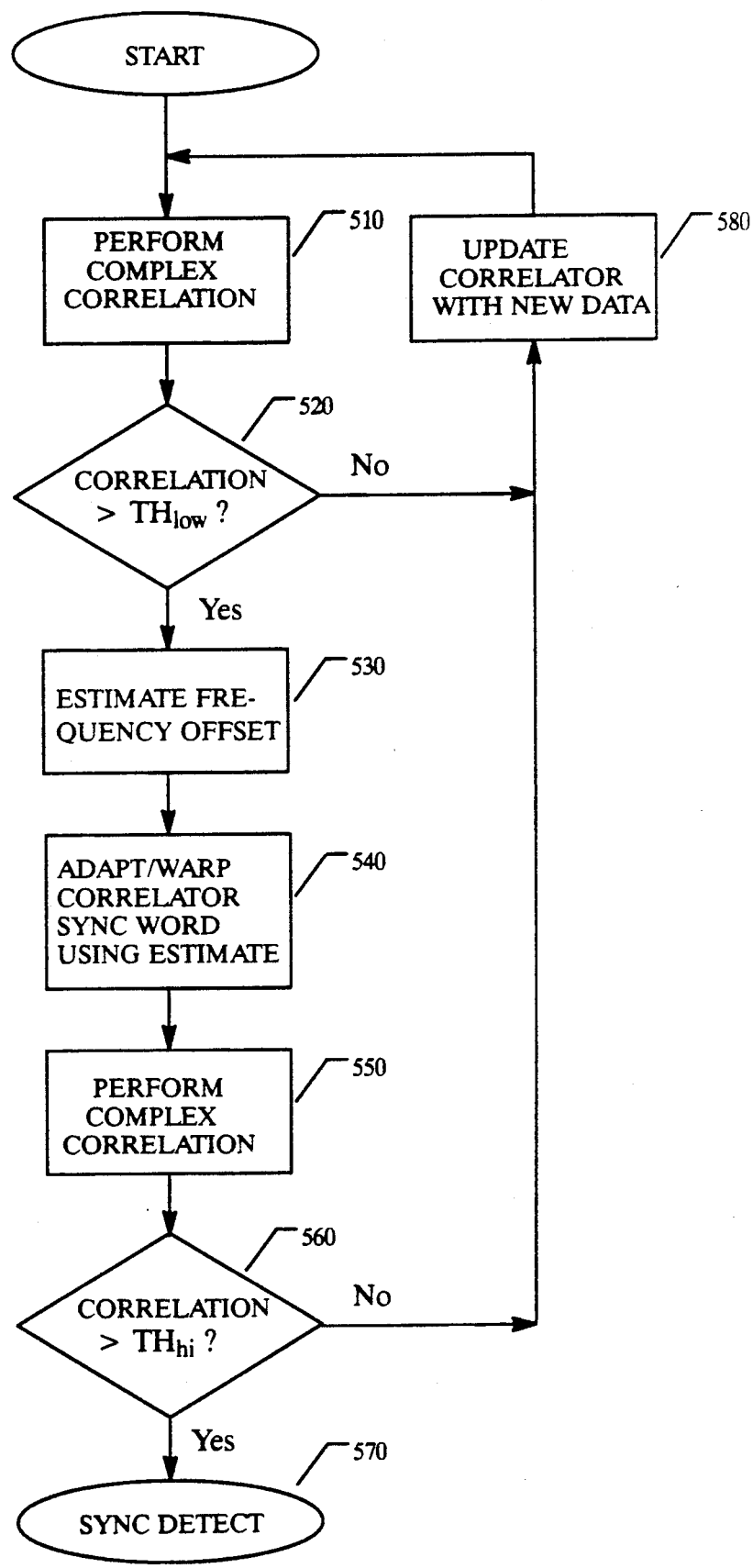
FIG. 5 illustrates the correlation process according to the present invention.

FIG. 5 illustrates the correlation process (that may be utilized in conjunction with the complex correlation apparatus of Borth et al U.S. Pat. No. 4,829,543, assigned to Motorola, the instant assignee) according to the present invention.

In operation (proceeding from top to bottom of FIG. 5), a correlation of the received signal is performed against a known reference sync word 510. If the correlation exceeds a relaxed threshold $Th_{low}$ (say 66% in this instance for up to 780 Hz of offset error) 520, then an estimate of the frequency offset is obtained according to a curve fit (presented below) 530, the sync word against which the correlation is performed is warped to compensate for the estimated error 540 and the degree of correlation to the warped sync word 550 is judged against a more stringent threshold $Th_{hi}$ 560. Synchronization is detected 570 when the correlation exceeds this more stringent threshold; otherwise, correlation against the more relaxed threshold is attempted again 580 with additional datum.

Curve fitting is attempted on the phase components of the correlation vectors. The slope of the curve fit (the rate of vector phase change) provides an indication of the carrier frequency offset. The curve fitting can be performed by a variety of techniques, each having their own computation versus performance tradeoffs. For example, using a classic least-mean-squared curve fit:

Where the received signal is represented by $Rx(i,\omega) = \exp(\theta(i) \pm \omega t))$ and $\theta(i)$ is the signal phase information of symbol i and $\omega t$ adds a linearly increasing phase component due to frequency offset component $\omega$.

$$\text{Estimated } [\omega T] = \chi = \frac{n\Sigma i\phi(i) - (\Sigma i)(\Sigma \phi(i))}{\Sigma i^2 - (\Sigma i)^2}$$

where:
n = number of correlation vector summed
i = symbol time
All summations made over $1 \leq i \leq n$
$\phi(i)$ = the phase component of the individual correlation vector terms
T = Symbol period Warping (pre-warping and re-warping) refers to the process of monotonically increasing (or decreasing) each individual vector phase term $\phi(i)$ by the estimated frequency offset component $\omega T$ (i.e., $\phi(i)_{new} = \phi(i)_{old} + i\omega T$).

Alternatively, the derivative of the phase component of the vector could be low-pass filtered, as in a unity-gain (DC valued) FIR filter (e.g., $y(n) = 8/7[x(n)/2 + x(n-1)/4 + x(n-2)/8]$. Advantageously, simple shifts rather than multiplications would be involved, however, to avoid transients, the filter would be initialized with the last two previous samples, $x(n-1)$ and $x(n-2)$) and then average the filter output to give the estimated $\omega T$.

Figure 6:
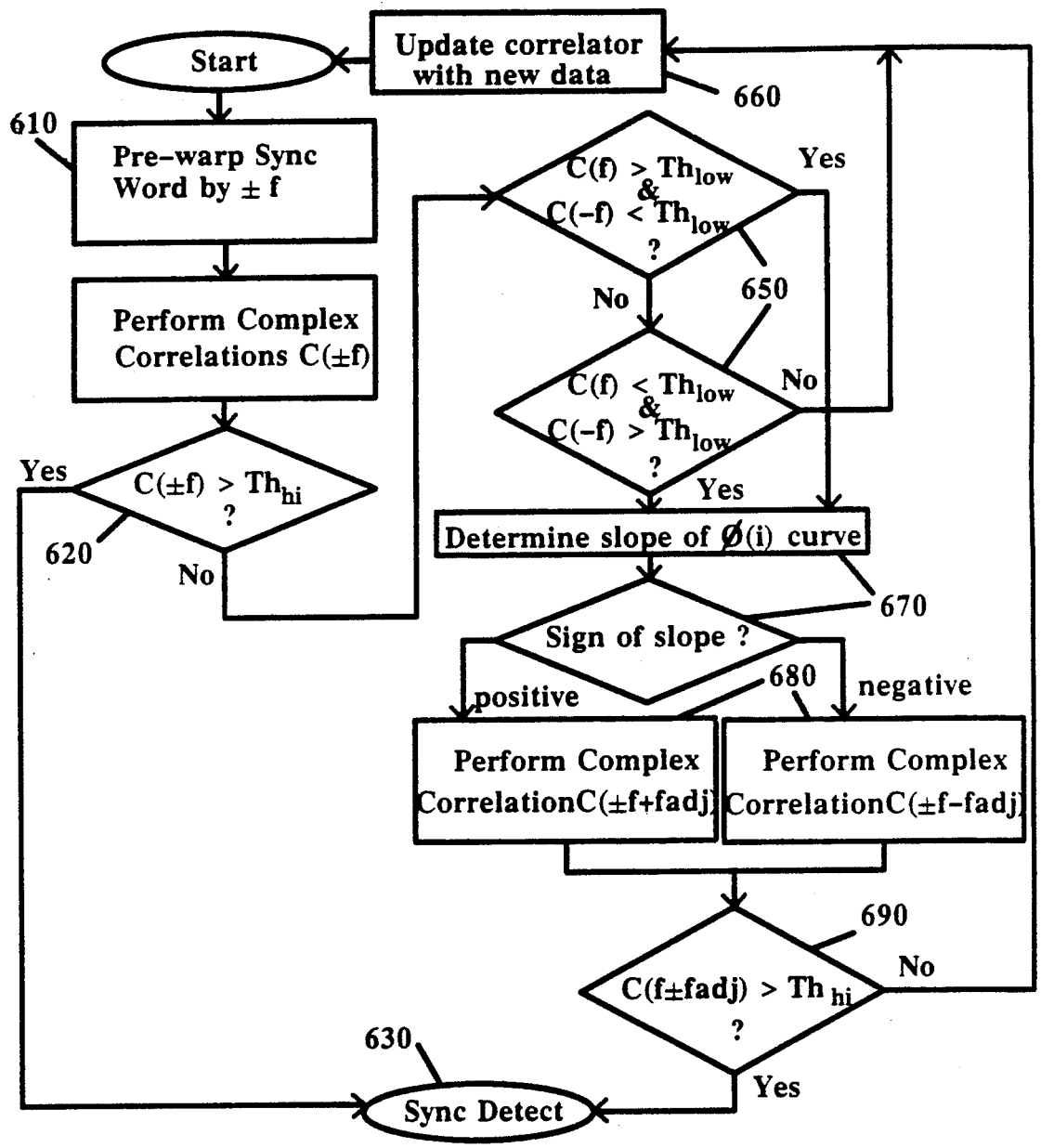
FIG. 6 illustrates the correlation process according to another embodiment of the present invention.

In another embodiment of the present invention, the sync word against which correlation is performed is pre-warped for an expected carrier frequency offset and re-warped through successive approximation. FIG. 6 illustrates the correlation process (that may be utilized in conjunction with the complex correlation apparatus of Borth et al U.S. Pat. No. 4,829,543, assigned to Motorola, the instant assignee) according to this embodiment of the present invention.

In operation, the sync word is pre-warped by plus and minus one-half of the worst-case offset $\pm f$ (e.g., 780 Hz/2 or 390 Hz) 610. Correlation of the received signal against one of these two pre-warped sync words will yield correlation above a stringent threshold $Th_{hi}$ 620, resulting in detection 630. Otherwise, the amount of correlation either does not exceed a more relaxed threshold $Th_{low}$ 650 and the correlator continues to look for correlation 660, or it exceeds the more relaxed threshold $Th_{low}$ and the correlator successively approximates the direction 670 (increasing or decreasing phase discrepancy depending on a positive or negative slope), pre-warps the sync word again 680 by, say half again f/2 the worst-case offset, namely 195 Hz ($\pm$fadj) conveniently just within the resolution of the mobile radio's AFC, and looks for correlation against the more stringent threshold $Th_{hi}$ 690. Correlating against a re-warped sync word is a simple matter of modifying the individual correlation vector terms by the incremental phase difference between the warped and re-warped sync word and re-summing the resultant vector terms.

Thus, in a receiver employing complex correlation, there has been provided a mechanism for carrier frequency offset equalization. There exists a linear phase progression in the correlation process that is indicative of frequency offset. One method involves curve fitting the phase progression in order to warp the sync word against which subsequent correlation is performed rather than controlling the reference frequency of the receiver. The other successively approximates the phase progression by pre- and re-warping the synchronization reference word within the correlation process itself rather than controlling the reference frequency of the receiver.

While the preferred embodiment of the invention has been described and shown, it will be appreciated by those skilled in this field that other variations and modifications of this invention may be implemented.

These and all other variations and adaptations are expected to fall within the ambit of the appended claims.

What we claim and desire to secure by Letters Patent is:

1. In a receiver employing complex correlation, a method of carrier frequency offset equalization comprising:
   iteratively performing complex correlation of the received signal against a correlation reference,
   determining a substantially monotonically increasing-/decreasing discrepancy between said received signal and said correlation reference
   and compensating for that discrepancy in at least one subsequent iteration.

2. A method as claimed in claim 1, wherein said compensating comprises curve fitting the discrepancy and adapting the correlation reference in at least one subsequent iteration in accordance with that curve fit discrepancy.

3. A method as claimed in claim 1, wherein said compensating comprises determining the rate of change of the discrepancy and adapting the correlation reference in at least one subsequent iteration in accordance with that determination.

4. A method as claimed in claim 3, wherein said determining comprises FIR filtering the derivative of the discrepancy.

5. A method as claimed in claim 4, wherein said determining further comprises averaging that filtered derivative.

6. A method as claimed in claim 1, wherein said correlation reference is predeterminally adapted.

7. In a receiver employing complex correlation, a method of carrier frequency offset equalization comprising:
performing complex correlation of the received signal against a correlation reference predeterminally adapted,
determining the presence or absence of a substantially monotonically increasing/decreasing discrepancy therebetween,
iterating the foregoing steps until the degree of correlation is established.

8. A method as claimed in claim 7 wherein said correlation reference is further adapted by the discrepancy so determined.

* * * * *